US012031196B2

(12) United States Patent
Hosoi et al.

(10) Patent No.: US 12,031,196 B2
(45) Date of Patent: Jul. 9, 2024

(54) METAL POWDER

(71) Applicant: TANAKA KIKINZOKU KOGYO K.K., Tokyo (JP)

(72) Inventors: Takuya Hosoi, Kanagawa (JP); Akio Nagaoka, Kanagawa (JP); Keisuke Maeto, Kanagawa (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 964 days.

(21) Appl. No.: 16/978,883

(22) PCT Filed: Mar. 27, 2019

(86) PCT No.: PCT/JP2019/013449

§ 371 (c)(1),
(2) Date: Sep. 8, 2020

(87) PCT Pub. No.: WO2019/189511

PCT Pub. Date: Oct. 3, 2019

(65) Prior Publication Data

US 2020/0407823 A1 Dec. 31, 2020

(30) Foreign Application Priority Data

Mar. 30, 2018 (JP) ................................ 2018-068687

(51) Int. Cl.

| | |
|---|---|
| ***C22C 1/04*** | (2023.01) |
| ***B22F 1/00*** | (2022.01) |
| ***B22F 1/05*** | (2022.01) |
| ***B22F 1/10*** | (2022.01) |
| ***B22F 1/103*** | (2022.01) |
| ***B22F 9/24*** | (2006.01) |
| ***C22C 5/04*** | (2006.01) |
| ***H01B 1/02*** | (2006.01) |

(52) U.S. Cl.

CPC .............. *C22C 1/0466* (2013.01); *B22F 1/00* (2013.01); *B22F 1/05* (2022.01); *B22F 1/10* (2022.01); *B22F 1/103* (2022.01); *B22F 9/24* (2013.01); *C22C 5/04* (2013.01); *H01B 1/02* (2013.01); *B22F 2301/25* (2013.01); *B22F 2304/10* (2013.01)

(58) Field of Classification Search

CPC . C22C 5/04; C22C 1/0466; B22F 9/24; B22F 1/05; B22F 1/103

See application file for complete search history.

(56) References Cited

U.S. PATENT DOCUMENTS

2018/0264555 A1 9/2018 Yamazaki et al.

FOREIGN PATENT DOCUMENTS

| | | | |
|---|---|---|---|
| EP | 3 187 289 | A1 | 7/2017 |
| JP | 64-39335 | A | 2/1989 |
| JP | 2010-144215 | A | 7/2010 |
| JP | 2017-57480 | A | 3/2017 |
| WO | 2009/119196 | A1 | 10/2009 |

OTHER PUBLICATIONS

English Abstract of DD 157709 (Dec. 1, 1982).*

International Search Report (PCT/ISA/210) dated May 14, 2019, issued by International Searching Authority in counterpart International Application No. PCT/JP2019/013449.

Written Opinion (PCT/ISA/237) dated May 14, 2019, issued by International Searching Authority in counterpart International Application No. PCT/JP2019/013449.

Communication dated Jan. 12, 2021 issued by the European Intellectual Property Office in counterpart European Application No. 19776912.8.

* cited by examiner

*Primary Examiner* — Jessee R Roe

(74) *Attorney, Agent, or Firm* — Sughrue Mion, PLLC

(57) ABSTRACT

The aim of the present invention is to provide a metal powder for an electroconductive paste with which a low-resistance electrode film can be formed. One embodiment of the present invention relates to a platinum-containing or platinum-alloy-containing metal powder for an electroconductive paste, the metal powder including a metal element or metal elements other than Pt, wherein the metal elements other than Pt include at least Ca, and may further include Al and Zr, and the total content of the Ca, Al and Zr among the metal elements other than Pt is 10-900 mass ppm.

17 Claims, 6 Drawing Sheets

EXAMPLE 1

EXAMPLE 10

EXAMPLE 11

METAL POWDER

TECHNICAL FIELD

The present invention relates to a metal powder, particularly, a metal powder for an electrically conductive paste used mainly in electronics.

BACKGROUND ART

With the recent miniaturization of electronics, an electronic component used therein is increasingly required to be small in size. Among others, in functional components using ceramics, such as inductor and capacitor, it is intended to achieve enhancement of properties as well as miniaturization by a multi-layered structure.

Such a multilayer component is produced by dispersing a metal powder in an organic binder-containing organic solvent to obtain an electrically conductive paste, printing the paste on a ceramics green sheet, subjecting the green sheet to steps of stacking, press bonding and cutting, thereafter firing the stack, and forming external electrodes.

The metal powder used for such an electrically conductive paste has been conventionally required to have high purity and high crystallinity.

For example, Patent Literature 1 describes a production method of a metal powder, including a step of preparing an acidic aqueous solution containing one or more noble metal compounds and a calcium compound, a step of adding the acidic aqueous solution to a basic aqueous solution to produce an oxide or hydroxide of the noble metal or a mixture thereof and calcium hydroxide, a step of reducing the oxide or hydroxide of the noble metal or the mixture thereof with a reducing agent, and a step of separating and heat-treating a solid matter containing a reduced form of the noble metal, in which a metal powder having a narrow particle-size distribution range and having high purity and high crystallinity is obtained.

CITATION LIST

Patent Literature

Patent Literature 1: JP-A-2017-57480 (the term “JP-A” as used herein means an “unexamined published Japanese patent application”)

SUMMARY OF INVENTION

Technical Problem

However, in the case of producing a platinum powder by the method described in Patent Literature 1, at the time of forming a paste and firing a membrane electrode, the powder may be sintered in the state where inclusion of the gas present in the space of powder is involved. As a result, the formed electrode film has insufficient denseness, and the resistance value increases. Thus, there is still room for improvement.

In consideration of these conventional problems, an object of the present invention is to provide a platinum- or platinum alloy-containing metal powder for an electrically conductive paste, which is a metal powder capable of forming an electrode film with a low resistance value.

Solution to Problem

As a result of many intensive studied to attain the object above, the present inventors have found that in a platinum- or platinum alloy-containing metal powder for an electrically conductive paste, when a metal powder containing a specific metal element in a specific amount range is used, an electrically conductive paste capable of forming an electrode film with low resistance can be provided. The present invention has been accomplished based on this finding.

More specifically, the present invention is as described below.

1. A metal powder, which is a platinum- or platinum alloy-containing metal powder for an electrically conductive paste, wherein
   - the powder contains, as the metal element, metal elements other than Pt,
   - the metal elements other than Pt contain at least Ca and may further contain Al and Zr, and
   - out of metal elements other than Pt, the total of the contents of Ca, Al and Zr is from 10 to 900 ppm by mass.
2. The metal powder according to 1 above, wherein the content of Ca as a metal element included in the platinum or platinum alloy is 200 ppm by mass or less.
3. The metal powder according to 1 or 2 above, wherein the platinum alloy is at least one platinum alloy selected from a platinum-gold alloy, a platinum-rhodium alloy, and a platinum-palladium alloy.
4. The metal powder according to any one of 1 to 3 above, wherein the content of Ca as a metal element included in the platinum or platinum alloy is 10 ppm by mass or more.
5. The metal powder according to any one of 1 to 3 above, wherein out of metal elements other than Pt, the contents of Ca, Al and Zr which are not included in the platinum or platinum alloy are from 10 to 900 ppm by mass.
6. The metal powder according to any one of 1 to 5 above, which contains, as the metal element, at least either one of Al and Zr.
7. The metal powder according to any one of 1 to 6 above, wherein the average particle diameter D50 is from 0.1 to 5.0 μm.
8. A metal powder, which is a platinum- or platinum alloy-containing metal powder for an electrically conductive paste, wherein
   - the powder contains, as the metal element, metal elements other than Pt,
   - the metal elements other than Pt contain at least Ca and may further contain Al and Zr,
   - out of metal elements other than Pt, the total of the contents of Ca, Al and Zr is from 30 to 900 ppm by mass and at the same time, the content of Ca as a metal element included in the platinum or platinum alloy is 30 ppm by mass or more, and
   - the content of the platinum or platinum alloy in the metal powder is 98.0 mass % or more relative to the total of the metal powder excluding the content of Ca.
9. The metal powder according to 8 above, wherein
   - the content of Ca as a metal element included in the platinum or platinum alloy is from 30 to 60 ppm by mass and at the same time, the total of the contents of Ca, Al and Zr which are not included in the platinum or platinum alloy is from 10 to 500 ppm by mass, or
   - the content of Ca as a metal element included in the platinum or platinum alloy is from 30 to 150 ppm by mass and at the same time, the powder contains Al and/or Zr which are not included in the platinum or platinum alloy.

10. The metal powder according to 8 above, wherein the content of Ca as a metal element included in the platinum or platinum alloy is 200 ppm by mass or less.
11. The metal powder according to any one of 8 to 10 above, wherein the platinum alloy is at least one platinum alloy selected from a platinum-gold alloy, a platinum-rhodium alloy, and a platinum-palladium alloy.
12. The metal powder according to any one of 8 to 11 above, wherein out of metal elements other than Pt, the total of the contents of Ca, Al and Zr which are not included in the platinum or platinum alloy is from 10 to 800 ppm by mass.
13. The metal powder according to any one of 8 to 12 above, which contains, as the metal element, at least either one of Al and Zr.
14. The metal powder according to any one of 8 to 13 above, wherein the average particle diameter D50 is from 0.1 to 5.0 μm.

Advantageous Effects of Invention

A low-resistance electrode film can be formed by using an electrically conductive paste of the metal powder of the present invention.

DESCRIPTION OF EMBODIMENTS

Figure 1:
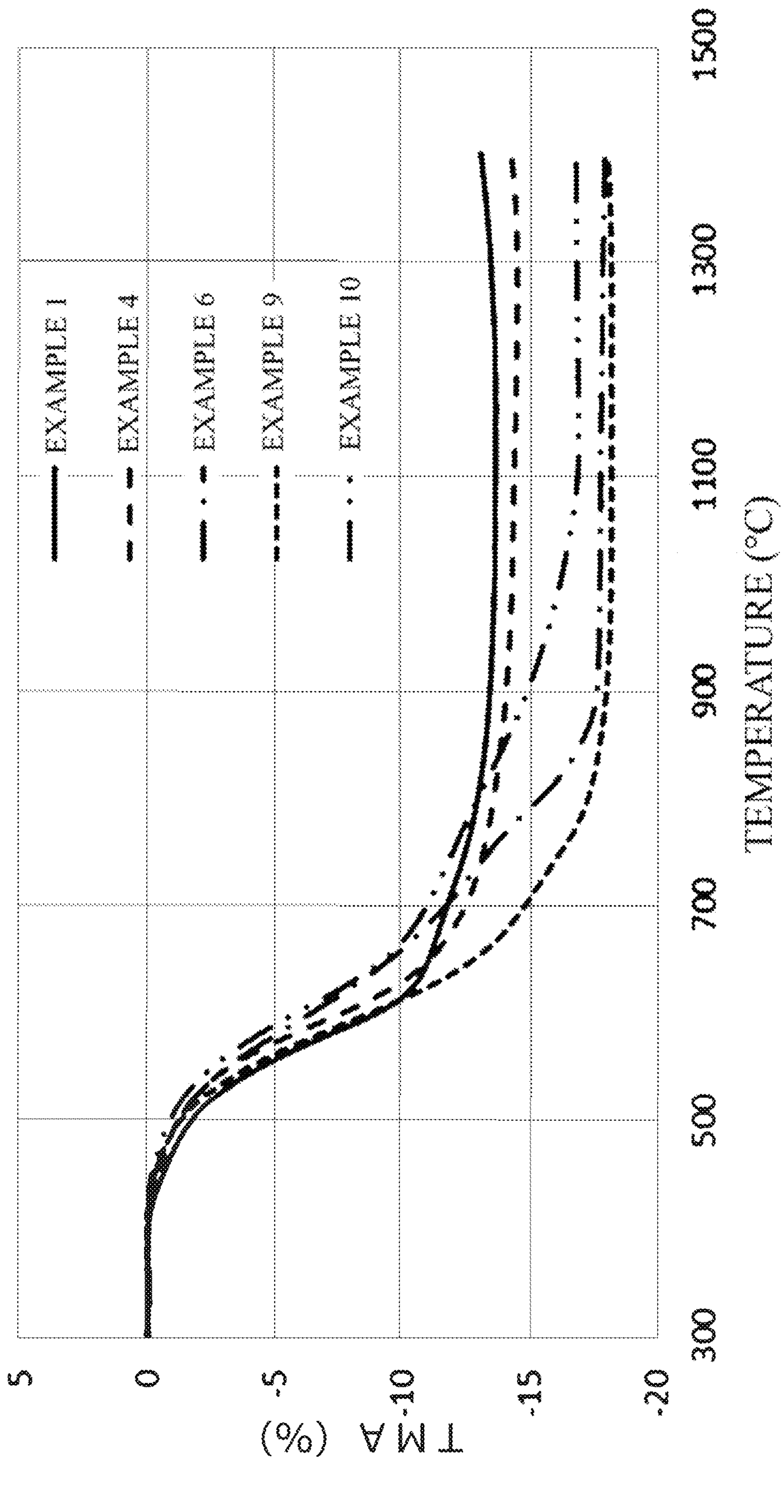
FIG. 1 is a graph illustrating the sintering shrinkage behavior after forming pastes of the metal powders of Examples.

The embodiments of the metal powder of the present invention are described in detail below.

The metal powder as one embodiment of the present invention is a platinum- or platinum alloy-containing metal powder for an electrically conductive paste, wherein the powder contains, as the metal element, metal elements other than Pt, the metal elements other than Pt contain at least Ca and may further contain Al and Zr, and out of metal elements other than Pt, the total of the contents of Ca, Al and Zr is from 10 to 900 ppm by mass.

It is considered that a low resistance of a membrane electrode can be realized by preparing the metal powder to contain a specific metal element in a specific amount range, because at the time of forming a paste from the metal powder and firing it, the growth of crystal grains is promoted to highly crystallize the paste and excess growth of crystal grains is suppressed to allow for the formation of an electrode film with little voids and high denseness.

[Platinum or Platinum Alloy]

The platinum used in the metal powder of the present invention is preferably platinum having a purity of 99 mass % or more. Note that this purity of platinum can be measured by ICP measurement of a solution obtained by chemically dissolving the powder.

The platinum alloy is an alloy of platinum and at least one metal alloyed with the platinum, and the structure of the alloy may contain an intermetallic compound, a solid solution, a eutectic mixture, or a structure in which these are present together.

The platinum alloy preferably contains platinum as the main component. In addition, the content of platinum in the platinum alloy is preferably 40 mass % or more, more preferably 50 mass % or more. The "main component" as used herein indicates a component whose content (mass) is largest among components contained in the platinum alloy.

The platinum alloy is not particularly limited in type but includes, for example, a platinum-gold alloy, a platinum-rhodium alloy, a platinum-palladium alloy, a platinum-silver alloy, and a platinum-iridium alloy, etc. The alloy is preferably at least one alloy selected from a platinum-gold alloy, a platinum-rhodium alloy, and a platinum-palladium alloy.

Whether to select platinum or a platinum alloy is based on the use and required properties of the electrically conductive paste. For example, in the application where low resistance is more preferentially required, such as sensor electrode or lead wire electrode, etc., platinum having lower resistance is selected. On the other hand, in the application such as heater electrode, etc., a platinum alloy having a low temperature coefficient of resistance (TCR) is applied.

The content of the platinum or platinum alloy in the metal powder of the present invention is preferably from 98.0 to 100 mass %, more preferably from 98.5 to 100 mass %, still more preferably from 99.0 to 100 mass %, relative to the total of the metal powder of the present invention excluding the content of Ca element. When the content is 98.0 mass % or more, outgassing due to impurities less occurs, and an electrode film having high denseness and low resistance can therefore be formed.

[Metal Element]

The metal powder of the present invention contains, as the metal element, metal elements other than Pt. The metal elements other than Pt contain at least Ca. In addition, the metal element in the present invention may contain metal elements other than Ca.

The metal powder of the present invention contains at least Ca as a metal element and may contain Ca as a single element or may contain Ca as a partial constituent element of a compound, etc. The compound containing Ca as part of the constituent element includes, for example, an inorganic salt such as calcium oxide, calcium peroxide and calcium hydroxide, an oxoacid salt such as calcium carbonate, calcium hydrogencarbonate and calcium nitrate, and an organic salt such as calcium acetate, calcium gluconate and calcium lactate.

The metal elements other than Ca are not particularly limited but include, for example, Al, Zr, Ti, Mg, Ni, etc. The metal element in the present invention preferably contains at least either one of Al and Zr.

These metal elements may be contained as a single element or may be contained as a partial constituent element of a compound, etc. The compound may be a compound containing two or more of the metal elements above.

The aluminum compound containing Al as part of the constituent element includes, for example, aluminum oxide, aluminum hydroxide, etc. Furthermore, the zirconium compound containing Zr as a constituent element includes, for example, zirconium oxide, zirconium hydroxide, etc.

It is important in achieving a low resistance of an electrode film that out of metal elements other than Pt, the total of the contents of Ca, Al and Zr is from 10 to 900 ppm by mass. When it is 10 ppm by mass or more, a dense film can be formed. The total of the contents is preferably 15 ppm by mass or more, more preferably 20 ppm by mass or more, still more preferably 25 ppm by mass or more, and most preferably 30 ppm by mass or more.

In addition, when the total of the contents of Ca, Al and Zr is 900 ppm by mass or less, Ca as a metal element serves by itself as a sintering inhibitor and can prevent the denseness from becoming insufficient. The total of the contents is preferably 600 ppm by mass or less, more preferably 550 ppm by mass or less, incidentally, the expression that the total of the contents of Ca, Al and Zr is from 10 to 900 ppm by mass does not exclude the case where the content of Al or Zr is 0 mass %.

With respect to the contents of these metal elements, as described later, the content of each metal element can be measured by ICP measurement of a solution obtained by chemically dissolving the metal powder in an acid.

With respect to Ca as a metal element in the metal powder of the present invention, the amount included in the platinum or platinum alloy in the metal powder is preferably 200 ppm by mass or less, more preferably 150 ppm by mass or less, still more preferably 100 ppm by mass or less, yet still more preferably 90 ppm by mass or less, even yet still more preferably 60 ppm by mass or less.

In addition, with respect to Ca as a metal element in the metal powder of the present invention, the amount included in the platinum or platinum alloy in the metal powder is preferably 10 ppm by mass or more, more preferably 15 ppm by mass or more, still more preferably 30 ppm by mass or more.

Furthermore, in the case where the metal powder of the present invention contains Al or Zr as a metal element, the Al amount as a metal element included in the platinum or platinum alloy in the metal powder is preferably 750 ppm by mass or less, more preferably 700 ppm by mass or less, still more preferably 650 ppm by mass or less.

In addition, the Zr amount as a metal element included in the platinum or platinum alloy in the metal powder is preferably 750 ppm by mass or less, more preferably 700 ppm by mass or less, still more preferably 650 ppm by mass or less.

With respect to one or more metal elements selected from Ca, Al and Zr in the metal powder of the present invention, from the viewpoint of achieving a further lower resistance of an electrode film, the total of the contents of Ca, Al and Zr which are not included in the platinum or platinum alloy in the metal powder is preferably 5 ppm by mass or more, more preferably 10 ppm by mass or more.

Furthermore, the total of the contents of non-included Ca, Al and Zr is preferably 900 ppm by mass or less, more preferably 800 ppm by mass or less, still more preferably 700 ppm by mass or less, yet still more preferably 500 ppm by mass or less.

Incidentally, when the amount included in the platinum or platinum alloy in the metal powder is 10 ppm by mass or more, the total of the contents of non-included Ca, Al and Zr is preferably 890 ppm by mass or less.

As one embodiment of the metal powder of the present invention, it is preferred that out of metal elements other than Pt, the total of the contents of Ca, Al and Zr is from 30 to 900 ppm by mass and the content of Ca as a metal element included in the platinum or platinum alloy is 30 ppm by mass or more.

In addition, as one embodiment of the metal powder of the present invention, it is preferred that the content of Ca as a metal element included in the platinum or platinum alloy is from 30 to 60 ppm by mass and at the same time, the total of the contents of Ca, Al and Zr which are not included in the platinum or platinum alloy is from 10 to 500 ppm by mass or that the content of Ca as a metal element included in the platinum or platinum alloy is from 30 to 150 ppm by mass and at the same time, the powder contains Al and/or Zr which are not included in the platinum or platinum alloy.

Here, the amount of a metal element (metal amount), such as Ca, included in the platinum or platinum alloy in the metal element means a metal amount which is not eluted at the time of being dispersed in a dilute acid incapable of dissolving a noble metal but can be eluted at the time of being dispersed in a strong acid capable of dissolving a noble metal, such as aqua regia. Furthermore, the amount of a metal element (metal amount), such as Ca, not included in the platinum or platinum alloy in the metal element means a metal amount which can be eluted at the time of being dispersed in a dilute acid incapable of dissolving a noble metal.

Specifically, the amount of a metal element (metal amount), such as Ca, not included in the platinum or platinum alloy in the metal element indicates, for example, an average value of values (at 5 places) obtained when 2 g of a metal powder collected at each of arbitrary 5 places is dispersed in 100 ml of 5% nitric acid (1.4 N nitric acid) and after stirring for 10 minutes and filtration, the filtrate is measured by ICP analysis. Furthermore, the amount of a metal element (metal amount), such as Ca, included in the platinum or platinum alloy in the metal element indicates a difference between an average value (i.e., the amount of a metal element such as Ca in the metal powder) of values (at 5 places) obtained when 2 g of a metal powder collected at each of arbitrary 5 places is dispersed in 100 ml of aqua regia and after stirring for 10 minutes and filtration, the filtrate is measured by ICP analysis, and the amount of a metal element (metal amount), such as Ca, not included in the platinum or platinum alloy in the metal powder.

[Metal Powder]

The specific surface area of the metal powder of the present invention is not particularly limited but, for example, is preferably from 0.2 to 5.0 $m^2/g$, more preferably from 0.3 to 3.0 $m^2/g$, still more preferably from 0.4 to 2.0 $m^2/g$. If the specific surface area of the metal powder of the present invention exceeds 5.0 $m^2/g$, it is difficult to form a paste having thixotropy suitable for screen printing. In addition, if the specific surface area of the metal powder of the present invention is less than 0.2 $m^2/g$, formation of a denser film is difficult due to insufficient sintering.

Incidentally, in the present invention, the specific surface area of the metal powder is that measured by the BET method. The BET specific surface area is measured, for example, according to JIS Z 8830 (Determination of the specific surface area of powders (solids) by gas adsorption method).

The average particle diameter D50 of the metal powder of the present invention is not particularly limited but, for example, is preferably from 0.1 to 5.0 μm, more preferably from 0.2 to 3.0 μm, still more preferably from 0.2 to 1.5 μm. If the average particle diameter D50 of the metal powder of the present invention is less than 0.1 μm, it is difficult to form a paste having thixotropy suitable for screen printing. In addition, if the average particle diameter D50 of the metal powder exceeds 5.0 μm, formation of a denser film is difficult due to insufficient sintering.

Here, the average particle diameter D50 of the metal powder of the present invention means a particle diameter at which the integrated quantity reaches 50% in an integrated particle quantity curve obtained as a result of measurement of the particle size distribution of the metal powder by a wet laser diffraction method.

The metal powder of the present invention contains the above-described metal elements in specific amounts, and the sintering end temperature (see, FIG. 1) at the time of forming a paste and firing it can thereby be made relatively high. Here, the sintering end temperature is a temperature at which after the metal powder undergoes mass transfer with one another due to heating and a sintered body is formed, the mass transfer stops, and means, in a graph of FIG. 1 illustrating a sintering shrinkage behavior, a minimum temperature below which the shrinkage•expansion phenomenon fails in continuously maintaining less than 0.1% per 10° C.

When the sintering end temperature becomes relatively high, at the time of forming a past from the metal powder of the present invention and sintering it, sintering occurs in the state of the gas present in the space of powder being outgassed, and in turn, the denseness of the electrode film formed is enhanced, as a result, the resistance value decreases. In the metal powder of the present invention, the sintering end temperature is preferably from 700 to 1,300° C., more preferably from 750 to 1,200° C., still more preferably from 800 to 1,100° C.

In the metal powder of the present invention, the resistance value in terms of film thickness of the membrane electrode produced using the metal powder is preferably 15.0 (mΩ/sq/10 μm) or less, more preferably 14.5 (mΩ/sq/10 μm) or less, still more preferably 13.8 (mΩ/sq/10 μm) or less.

[Production Method of Metal Powder]

The production method of the metal powder of the present invention is not particularly limited as long as the metal powder of the present invention is obtained.

For example, the metal powder of the present invention may be produced by adding and mixing specific amounts of a Ca compound, etc. to an existing platinum powder or platinum alloy powder such that at least Ca is contained as a metal element.

The metal powder may also be produced by involving the inclusion of a specific amount of at least Ca as a metal element in the metal powder of the present invention in the course of producing a platinum powder or a platinum alloy powder.

In addition, the metal powder may be produced by producing a platinum powder or a platinum alloy powder and adding a specific amount of a Ca compound, etc. to the obtained powder such that at least Ca is contained as a metal element.

Furthermore, the metal powder may be produced by involving the inclusion of at least Ca in the platinum or platinum alloy in the metal powder of the present invention in the course of producing a platinum powder or a platinum alloy powder, and further adding a specific amount of a compound, etc. containing Ca as a metal element to the obtained powder, thereby adjusting the content of Ca as a metal element.

The same holds true for the metal element other than Ca, such as Al or Zr, etc.

From the viewpoint of controlling the amount of Ca included as a metal element in the platinum or platinum alloy in the metal powder, it is preferable to produce the metal powder by involving the inclusion of a specific amount of Ca as a metal element in the course of producing a platinum powder or a platinum alloy powder, or it is preferable to produce the metal powder by involving the inclusion of Ca as a metal element in the platinum or platinum alloy in the powder in the course of producing a platinum powder or a platinum alloy powder, and further add a Ca compound, etc. to the obtained powder, thereby adjusting the content of Ca as a metal element in the metal powder.

The same holds true for the metal element other than Ca, such as Al or Zr, etc.

In the case of producing the metal powder by mixing an existing platinum powder or platinum alloy powder with a Ca compound, etc. in order to incorporate Ca as a metal element, the mixing method is not particularly limited, and the metal powder can be produced by performing the mixing according to any conventionally known method.

The same holds true for the case of incorporating the metal element other than Ca, such as Al or Zr.

The method for producing the metal powder by involving the inclusion of a specific amount of at least Ca as a metal element in the platinum or platinum alloy in the metal powder of the present invention in the course of producing a platinum powder or a platinum alloy powder includes, for example, the following method.

More specifically, this is a method including a step of preparing an acidic aqueous solution of a platinum compound and a calcium compound (acidic aqueous solution preparation step), a step of adding the acidic aqueous solution to a basic aqueous solution to produce an oxide or hydroxide of platinum or a mixture thereof and calcium hydroxide (reaction step), a step of reducing the oxide or hydroxide of platinum or the mixture thereof with a reducing agent (reduction step), and a step of separating and heat-treating a solid matter containing a reduced form of platinum (heat treatment step).

In addition, this method preferably further includes, after the heat treatment step, a step of applying an acid treatment to the heat-treated product (acid treatment step).

According to the method above, at the time when a sintered body is formed by mass transfer of the platinum particle with one another during heat treatment, a fine calcium compound remains inside the sintered body, so that the metal powder can be produced with the inclusion of at least Ca as a metal element in the platinum or platinum alloy in the metal powder.

Here, in order to involve the inclusion of a specific amount of Ca as a metal element in the platinum or platinum alloy, the method may be appropriately performed by adjusting the input ratio between the platinum compound and the calcium compound or the heat treatment temperature and heat treatment time. The same holds true for Al or Zr.

In addition, the method for controlling the contents of Ca, Al and Zr not included in the platinum or platinum alloy in the metal powder includes a method of further adding one or more metals selected from Ca, Al and Zr or a compound containing such a metal to the metal powder, and a method where in the acid treatment step at the production of the metal powder, the treatment is performed by appropriately adjusting the kind and concentration of the acid so as to allow for no remaining of non-included Ca, Al and Zr.

The method for producing the metal powder with inclusion of Ca as a metal element is described below, but the method is not limited to the following. As well, in the case of producing the metal powder with inclusion of Al or Zr as a metal element, the metal powder can be appropriately produced by taking into consideration the following method.

(Acidic Aqueous Solution Preparation Step)

First, an acidic aqueous solution containing one or more platinum compounds and a calcium compound is prepared. The platinum compound is not particularly limited but includes, for example, hexachloroplatinic(IV) acid, tetrachloroplatinic(II) acid, tetraammineplatinic(II) acid, etc. The gold compound includes, for example, chloroauric(III) acid, tetrachloroauric(III) acid, ammonium tetrachloroaurate(III), etc.

The calcium compound is not particularly limited as long as it is soluble in the acidic aqueous solution, but examples thereof include calcium carbonate, calcium hydroxide, calcium oxide, calcium sulfate, calcium chloride, calcium nitrate, etc. Among these, calcium chloride and calcium nitrate are preferred, because they readily dissolve in water and are easy to handle.

Incidentally, the compounds recited above other than calcium chloride and calcium nitrate are sparingly soluble in water, but an aqueous solution of a platinum compound is strongly acidic in many cases, and the compounds can be dissolved in the aqueous solution of a platinum compound.

However, at the time of dissolving these compounds in an aqueous solution of a platinum compound, heat generation may occur or a thermal alteration may be caused, and it is therefore preferable to use calcium chloride or calcium nitrate.

One of those calcium compounds may be used alone, or two or more thereof may be used in combination.

When preparing the acidic aqueous solution, the proportions of platinum compound and calcium compound used are not particularly limited, but if the proportion of the platinum compound is too large, the proportion of the calcium compound is too small, resulting in a tendency that necking occurs frequently in the later-described heat treatment and platinum or platinum alloy particles having evenness in particle diameter can hardly be obtained.

On the other hand, if the proportion of the platinum compound is too small, the effect due to addition of the calcium compound tends to be saturated, and the amount of an acid necessary for removing calcium oxide in the later-described acid treatment increases.

Accordingly, the ratio between the platinum compound and calcium compound used is, in terms of weight ratio on an atomic basis (noble metal atoms):(calcium atoms), preferably from 10:1 to 0.2:1, more preferably from 5:1 to 0.5:1.

The preparation method when preparing the acidic aqueous solution of a platinum compound and a calcium compound is not particularly limited. For example, the acidic aqueous solution may be prepared by producing an aqueous solution of a platinum compound, and dissolving a calcium compound therein.

The acidic aqueous solution may also be prepared by preparing an aqueous solution of a calcium compound, and dissolving a platinum compound therein.

Alternatively, the acidic aqueous solution may be prepared by separately preparing an aqueous solution of a platinum compound and an aqueous solution of a calcium compound, and mixing these aqueous solutions together.

Depending on the platinum compound and calcium compound, the desired acidic aqueous solution is obtained by merely dissolving the compounds in water, but an acid may be added, if desired, at any one stage or a plurality of stages in preparing the acidic aqueous solution.

Among others, it is preferable to previously prepare the platinum compound as an acidic aqueous solution and dissolve the calcium compound therein or mix an aqueous solution of the calcium compound therewith so as to prepare an acidic aqueous solution containing a platinum compound and a calcium compound.

The acid used here may be sufficient if it can enhance the solubility of the platinum compound or calcium compound in water or can adjust the aqueous solution to the desired acidity, and examples thereof include an inorganic acid such as hydrochloric acid and nitric acid, and an organic acid such as acetic acid and formic acid.

Although sulfuric acid can be used, depending on the intended use of the fine metal particle it may be necessary to unduly prevent sulfur atom from getting mixed in with, and from this viewpoint, use of sulfuric acid is undesirable.

The pH of the acidic aqueous solution prepared is not particularly limited as long as it is acidic, but from the viewpoint of preventing the noble metal from precipitating as an oxide or a hydroxide, the pH is preferably 4 or less, more preferably 2 or less, still more preferably 1 or less.

(Reaction Step)

Next, the acidic aqueous solution prepared as above is added to a basic aqueous solution to produce an oxide or hydroxide of platinum or a mixture thereof and calcium hydroxide.

As the basic aqueous solution, for example, an aqueous sodium hydroxide solution, an aqueous potassium hydroxide solution, ammonia water, etc. can be used.

In addition, the pH of the basic aqueous solution is not particularly limited as long as it is basic, but from the viewpoint of efficiently and appropriately precipitating the calcium compound as a hydroxide, the pH is preferably 11 or more, more preferably 12 or more.

The ratio in which the acidic aqueous solution is added to the basic aqueous solution may be appropriately adjusted by taking account of the pH of the acidic aqueous solution, the pH of the basic aqueous solution, etc., but it is preferable to prepare the basic aqueous solution in an amount sufficient enough to neutralize the acidic aqueous solution in which a platinum compound and a calcium compound are dissolved. More specifically, it is preferable to use the basic aqueous solution in an amount sufficient enough to precipitate an oxide or hydroxide of platinum or a mixture thereof and calcium hydroxide.

In this reaction step, the acidic aqueous solution is added to the basic aqueous solution. For example, it is preferable to add the acidic aqueous solution to the basic aqueous solution with stirring either at a time or dropwise gradually by appropriately using a feed pump, pipette, dropper, funnel, etc.

By such an operation, the acidic aqueous solution having evenly dispersed therein platinum ions and calcium ions is added to the basic, preferably strongly basic, aqueous solution, and therefore, production of an oxide or hydroxide of platinum or a mixture thereof and production of calcium hydroxide start almost simultaneously upon addition or after the addition, or production of an oxide or hydroxide of platinum or a mixture thereof starts immediately after the start of production of calcium hydroxide, that is, production of an oxide or hydroxide of platinum or a mixture thereof starts before the completion of production of calcium hydroxide, as a result, a liquid in which these compounds are evenly dispersed is obtained.

Accordingly, through the subsequent steps, a metal powder having a narrow particle-size distribution range and evenness in particle diameter can be obtained.

Incidentally, at the time of adding the acidic aqueous solution to the basic aqueous solution, it is preferable to add the acidic aqueous solution to the basic aqueous solution which is under stirring.

In addition, according to the present production method, platinum or platinum alloy particles are produced in the state pf the platinum compound or calcium compound being dissolved in water, and the particle diameters of the platinum or platinum alloy particle and the calcium hydroxide particle or the mixing ratio between these particles can therefore be controlled by the control of the reaction conditions, which in turn makes it possible to control the properties of the metal powder obtained and stabilize the quality.

In addition, the reaction solution after adding the whole amount of the acidic aqueous solution to the basic aqueous solution is preferably basic. In this case, the platinum hydroxide and calcium hydroxide produced can be stably present in the reaction solution.

The pH of the reaction solution after adding the whole amount of the acidic aqueous solution to the basic aqueous solution is preferably 11 or more, more preferably 12 or more.

On the other hand, in the case where the basic aqueous solution is gradually added to the acidic aqueous solution, the pH gradually increases from the acidic region to the basic region. In this case, the production of platinum hydroxide starts occurring first, and the production of calcium hydroxide thereafter occurs.

Accordingly, in this case, platinum hydroxide and calcium hydroxide are not produced simultaneously, and the platinum hydroxide whose production has started first is a mass based on platinum not surrounded by calcium and serves as a basis for coarse particles, which makes it difficult to obtain a uniform particle diameter.

[Reduction Step]

Following the reaction step, the oxide or hydroxide of platinum or a mixture thereof is reduced with a reducing agent. More specifically, a reducing agent is added to the liquid obtained in the reaction step, in which an oxide or hydroxide of platinum or a mixture thereof and containing calcium hydroxide are contained, to reduce the oxide or hydroxide of platinum or a mixture thereof in the liquid.

The reducing agent used is not particularly limited as long as it can reduce the oxide or hydroxide of platinum or a mixture thereof, but examples thereof include hydrazine, formalin, glucose, hydroquinone, hydroxylammonium chloride, sodium formate, etc. In view of precipitation efficiency and evenness in the particle diameter, hydrazine is preferred. The amount of the reducing agent used is also not particularly limited and may be an amount large enough to sufficiently reduce the oxide or hydroxide of platinum or a mixture thereof.

(Heat Treatment Step)

Subsequently, a solid matter (insoluble matter) containing a reduced form of platinum is separated from the liquid obtained after reducing the oxide or hydroxide of platinum or a mixture thereof and then heat-treated (fired).

Here, after a liquid in which an oxide or hydroxide of platinum or a mixture thereof and calcium hydroxide are evenly dispersed is obtained in the reaction step above, a solid matter (insoluble matter) is separated.

Consequently, in the separated solid matter, a reduced form of platinum and calcium hydroxide are contained in an evenly dispersed state. When a heat treatment is applied to this solid matter, the reduced form of platinum, which is in the state of having a valence of 0, comes into a semi-fused state and gets aggregated.

On the other hand, the coexistent calcium hydroxide is pyrolyzed into calcium oxide. Morphologically, although the reduced form of platinum, which is in the state of having a valence of 0, comes into a semi-fused state and gets aggregated, this is a thermally stable solid and is inhibited from aggregation due to it being surrounded by calcium oxide, leading to a state in Which the calcium oxide is disposed surrounding the periphery of the aggregated platinum.

In this way, from the state where the reduced form of platinum and calcium hydroxide are evenly dispersed, particles are grown in an environment not allowing for free growth of platinum or platinum alloy particles, so that metal particles having evenness in the metal particle diameter, a narrow particle-diameter distribution range, high purity, and high crystallinity can be obtained.

As the method for separating a solid matter containing a reduced form of platinum from the liquid obtained after reducing the oxide or hydroxide of platinum or a mixture thereof, a conventionally known solid/liquid separation method such as filtration, centrifugal separation, etc. can be appropriately selected and applied.

In addition, after the separation of a solid matter, the solid matter may be dried, if desired, to remove water adherent to the solid matter. The drying temperature is not particularly limited, but the drying can be performed, for example, at 80 to 200° C.

The heat treatment temperature at the time of heat-treating the separated solid matter is not particularly limited and may be appropriately adjusted so as to allow inclusion of a desired amount of metal element (Ca, etc.).

From the viewpoint of further improving the purity and crystallinity of the metal powder, the heat treatment temperature is preferably 800° C. or more, more preferably 900° C. or more. The upper limit of the heat treatment temperature is also not particularly limited, but from the viewpoint of uniformly controlling the particle diameter, the heat treatment temperature is preferably not higher by 100° C. or more than the melting point of platinum.

As well, the heat treatment time is not particularly limited and may be appropriately adjusted so as to allow inclusion of a desired amount of a metal element (Ca, etc.). The heat treatment time is preferably from 0.2 to 5 hours, more preferably from 0.5 to 3 hours. When the heat treatment time is 0.2 hours or more, this is preferred because the platinum particles grow sufficiently, in addition, when the heat treatment time is 5 hours or less, the production efficiency is advantageously high.

For the reason that there is a possibility of being affected by oxidation, the heat treatment atmosphere at the time of applying a heat treatment to the separated solid matter is preferably an inert atmosphere, such as nitrogen, argon, helium, etc., or a reducing atmosphere, such as hydrogen.

(Acid Treatment Step)

In the present production method, after the heat treatment step above, the heat-treated product having undergone the heat treatment is preferably further subjected to an acid treatment. Here, although the heat-treated product having undergone the heat treatment contains platinum or platinum alloy particles and calcium oxide, only the calcium oxide can be dissolved in an acid by the acid treatment, and the amount of calcium in the metal powder can thereby be adjusted.

The acid treatment may be performed by immersing and holding the heat-treated product in an aqueous acid solution. The acid used here may be any as long as the target noble-metal fine particle does not dissolve and only the calcium oxide can be dissolved in water. Preferable specific examples are one or more acids selected from hydrochloric acid, nitric acid, and acetic acid.

The amount of the acid used for the acid treatment may be sufficient if it is an amount large enough for the reaction with the calcium oxide, but actually, the acid treatment is performed by the immersion in an aqueous acid solution of excess acid so that the acidity can be maintained. The acid treatment step is preferably conducted while stirring the system.

In addition, when washing such as water washing, drying, etc. is performed as needed after the acid treatment, a metal powder containing a desired amount of a metal element can be obtained. The drying temperature is not particularly limited, but the drying can be performed, for example, at 80 to 200° C.

EXAMPLES

The present invention is further described below by referring to Examples, but the invention is not limited to the following Examples.

[Measurement of Amount of Metal (Ca, Al, and Zr) Element]

An average value of values (at 5 places) obtained when 2 g of a metal powder was collected at each of arbitrary 5 places, each of the collected metal powders was dispersed in 100 ml of aqua regia and after stirring for 10 minutes and filtration, the filtrate was measured by ICP analysis using ICE OEM 5100 manufactured by Agilent Technologies, was defined as the Ca, Al or Zr amount.

Furthermore, a difference between an average value of values (at 5 places) obtained when 2 g of a metal powder was collected at each of arbitrary 5 places, each of the collected metal powders was dispersed in 100 ml of 5% nitric acid (1.4 N nitric acid) and after stirring for 10 minutes and filtration, the filtrate was measured by ICP analysis using ICE OEM 5100 manufactured by Agilent Technologies, and an average value of values (at 5 places) obtained when 2 g of a metal powder was collected at each of arbitrary 5 places, each of the collected metal powders was dispersed in 100 ml of aqua regia and after stirring for 10 minutes and filtration, the filtrate was measured by ICP analysis using ICE OEM 5100 manufactured by Agilent Technologies, Inc., was determined and defined as the included. Ca, Al or Zr amount. Incidentally, the measurement limit of the metal amount is less than 10 ppm by mass,

[Resistance Value in Terms of Film Thickness]

A pattern of 0.5 mm in width and 2.0 mm in length on an alumina substrate was measured for the resistance value in terms of film thickness by using the four-terminal method (34410A manufactured by Agilent Technologies, Inc.). The film thickness was measured using a surface roughness meter (KOSAKA Laboratory SP-81D).

Example 1

50.0 g of calcium chloride was dissolved in 200 g of pure water to prepare an aqueous calcium chloride solution. Then, 125.0 g of a chloroplatinic acid solution (platinum content rate: 16.4 wt %) was added to the aqueous calcium chloride solution prepared above and thoroughly stirred to prepare an acidic aqueous solution containing platinum ion and calcium ion (ratio of Pt and Ca elements (Pt:Ca) of platinum compound and calcium compound=2.2:1). While stirring 500 g of an aqueous 40% potassium hydroxide solution heated at 50° C., the acidic aqueous solution was added dropwise over 10 minutes. Next, 200 g of 5% hydrazine was added and after further stirring for 1 hour and cooling to room temperature, the insoluble mater was separated by filtration. The insoluble matter separated by filtration was washed, then dried at 120° C., and subjected to a heat treatment at 1,300° C. for 1 hour in a nitrogen atmosphere. Subsequently, 1 L of a 3 mol/L nitric acid solution was prepared, and the heat-treated product was added thereto to perform an acid treatment, thereby dissolving and removing the calcium component. Thereafter, the residue was washed and dried at 120° C. to obtain a platinum powder (platinum purity: >99 mass %). The metal amount contained in the platinum powder was measured by ICP analysis, and the results are shown in Table 1. Incidentally, the included Al and Zr amounts were less than 10 ppm by mass (<10 ppm by mass) and thus fell below the measurement limit of the metal amount.

Figure 2:
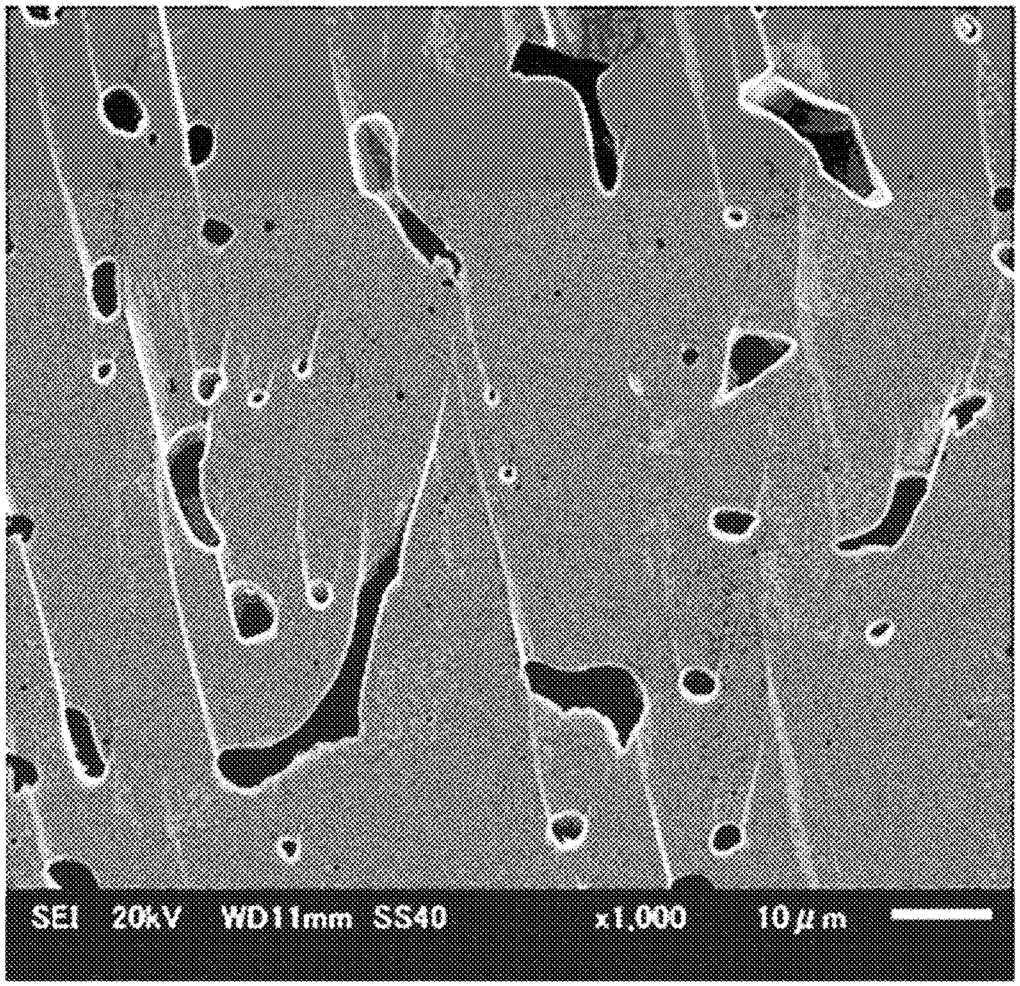
FIG. 2 is a cross-sectional SEM photograph produced using the metal powder of Example 1.
Figure 3:
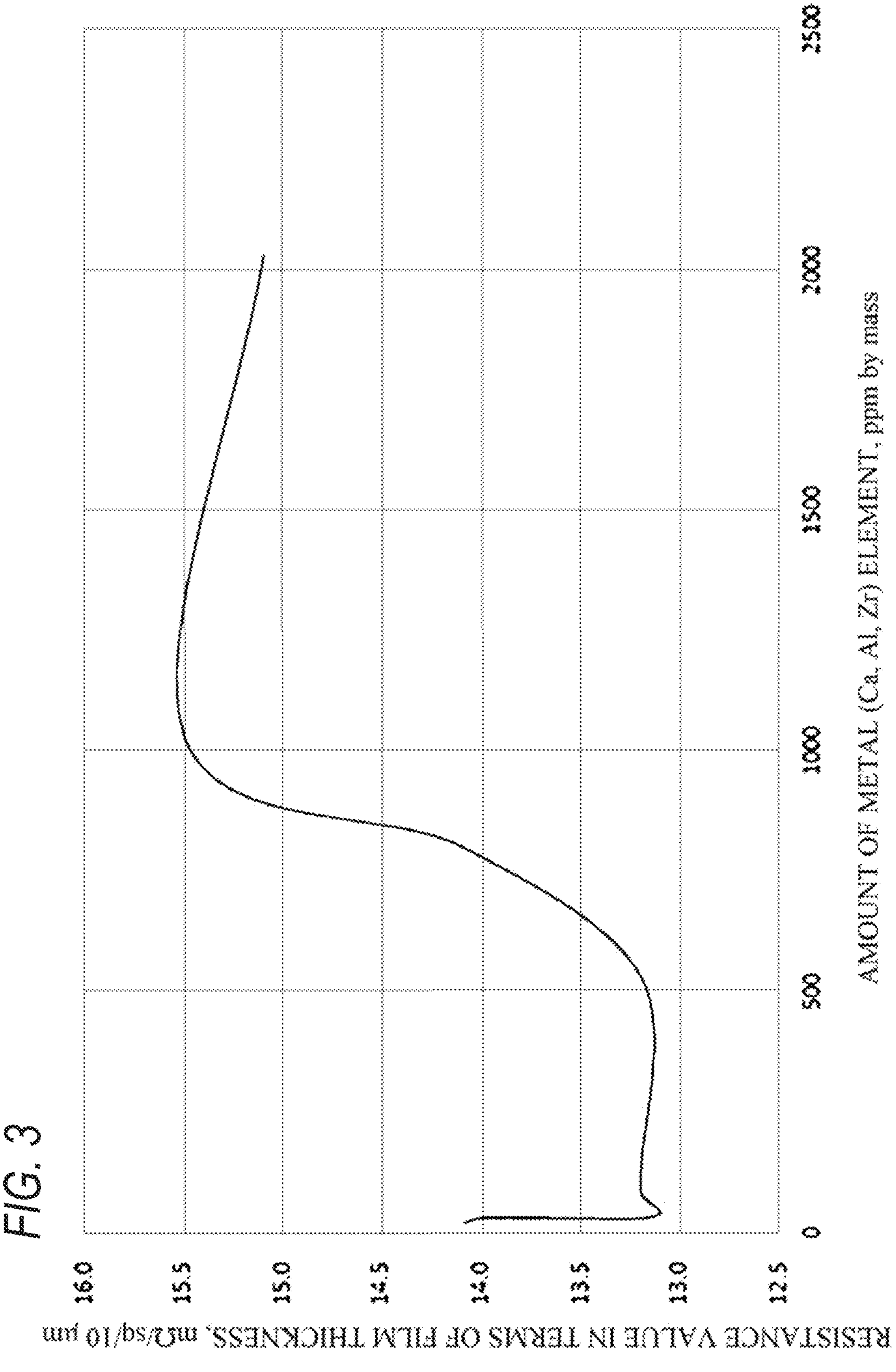
FIG. 3 is a graph illustrating the relationship between the amount of metal (Ca, Al, Zr) element and the resistance value in terms of film thickness.

Furthermore, a paste was formed from the obtained platinum powder by using a three-roll mill and heated under the conditions of 1,500° C., 1 hour and air atmosphere to produce a membrane electrode. The sintering temperature was measured using TMA (manufactured by NETZSCH), and the results are shown in FIG. 1. An SEM photograph of the produced membrane electrode is shown in FIG. 2. In addition, with respect to the produced membrane electrode, the resistance value in terms of film thickness was measured. The results are shown in Table 1 and FIG. 3.

Example 2

A platinum powder and a membrane electrode were produced in the same manner as in Example 1 except that the included Ca amount was adjusted by changing the heat treatment conditions to 1,000° C. and 1 hour. The measurement results of the metal amount contained in the obtained platinum powder and the resistance value in terms of film thickness are shown in Table 1 and FIG. 3.

Example 3

A platinum powder and a membrane electrode were produced in the same manner as in Example 1 except that calcium carbonate ($CaCO_3$) corresponding to a Ca amount of 10 ppm by mass was added to the produced platinum powder. The measurement results of the metal amount contained in the obtained platinum powder and the resistance value in terms of film thickness are shown in Table 1 and FIG. 3. Incidentally, the Ca amount (10 ppm by mass) in the $CaCO_3$ added corresponds to the content of Ca not included in platinum in the platinum powder of Example 3.

Example 4

A platinum powder and a membrane electrode were produced in the same manner as in Example 2 except that calcium carbonate ($CaCO_3$) corresponding to a Ca amount of 10 ppm by mass was added to the produced platinum powder. The measurement results of the metal amount contained in the obtained platinum powder and the resistance value in terms of film thickness are shown in Table 1 and FIG. 3, In addition, the sintering temperature was measured using TMA (manufactured by NETZSCH), and the results are shown in FIG. 1. Incidentally, the Ca amount (10 ppm by mass) in the $CaCO_3$ added corresponds to the content of Ca not included in platinum in the platinum powder of Example 4.

Example 5

A platinum powder and a membrane electrode were produced in the same manner as in Example 2 except that calcium carbonate ($CaCO_3$) corresponding to a Ca amount of 50 ppm by mass was added to the produced platinum powder. The measurement results of the metal amount contained in the obtained platinum powder and the resistance value in terms of film thickness are shown in Table 1 and FIG. 3. Incidentally, the Ca amount (50 ppm by mass) in the $CaCO_3$ added corresponds to the content of Ca not included in platinum in the platinum powder of Example 5.

Example 6

A platinum powder and a membrane electrode were produced in the same manner as in Example 2 except that calcium carbonate ($CaCO_3$) corresponding to a Ca amount of 100 ppm by mass was added to the produced platinum powder. The measurement results of the metal amount contained in the obtained platinum powder and the resistance value in terms of film thickness are shown in Table 1 and FIG. 3. In addition, the sintering temperature was measured using TMA (manufactured by NETZSCH), and the results are shown in FIG. 1. Incidentally, the Ca amount (100 ppm by mass) in the $CaCO_3$ added corresponds to the content of Ca not included in platinum in the platinum powder of Example 6.

Example 7

A platinum powder and a membrane electrode were produced in the same manner as in Example 2 except that calcium carbonate ($CaCO_3$) corresponding to a Ca amount of 500 ppm by mass was added to the produced platinum powder. The measurement results of the metal amount contained in the obtained platinum powder and the resistance value in terms of film thickness are shown in Table 1 and FIG. 3. Incidentally, the Ca amount (500 ppm by mass) in the $CaCO_3$ added corresponds to the content of Ca not included in platinum in the platinum powder of Example 7.

Example 8

A platinum powder and a membrane electrode were produced in the same manner as in Example 2 except that calcium carbonate ($CaCO_3$) corresponding to a Ca amount of 770 ppm by mass was added to the produced platinum powder. The measurement results of the metal amount contained in the obtained platinum powder and the resistance value in terms of film thickness are shown in Table 1 and FIG. 3. Incidentally, the Ca amount (770 ppm by mass) in the $CaCO_3$ added corresponds to the content of Ca not included in platinum in the platinum powder of Example 8.

Example 9

A platinum powder and a membrane electrode were produced in the same manner as in Example 2 except that aluminum oxide ($Al_2O_3$) corresponding to an Al amount of 100 ppm by mass was added to the produced platinum powder. The measurement results of the metal amount contained in the obtained platinum powder and the resistance value in terms of film thickness are shown in Table 1 and FIG. 3. In addition, the sintering temperature was measured using TMA (manufactured by NETZSCH), and the results are shown in FIG. 1. Incidentally, the Al amount (100 ppm by mass) in the $Al_2O_3$ added corresponds to the content of Al not included in platinum in the platinum powder of Example 9.

Example 10

Figure 4:
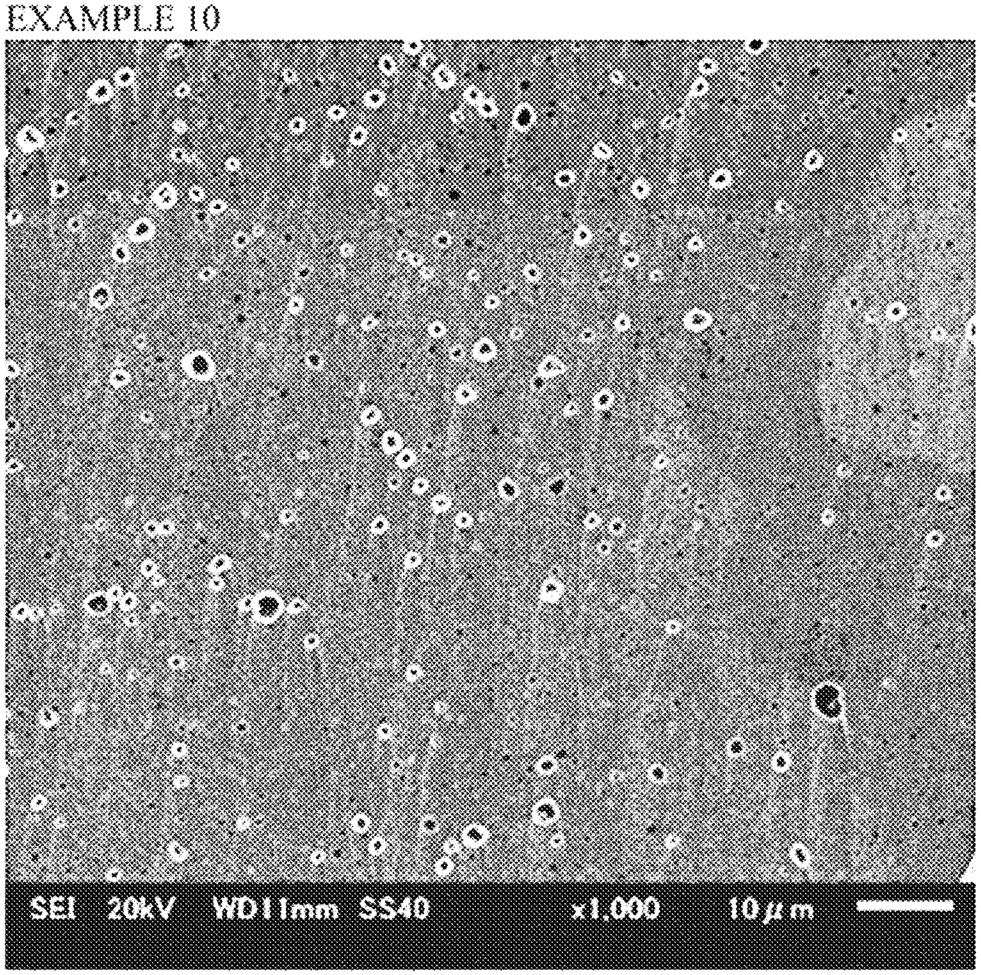
FIG. 4 is a cross-sectional SEM photograph of an electrode film produced using the metal powder of Example 10.

A platinum powder and a membrane electrode were produced in the same manner as in Example 2 except that aluminum oxide ($Al_2O_3$) corresponding to an Al amount of 500 ppm by mass was added to the produced platinum powder. The measurement results of the metal amount contained in the obtained platinum powder and the resistance value in terms of film thickness are shown in Table 1 and FIG. 3. An SEM photograph of the produced membrane electrode is shown in FIG. 4. In addition, the sintering temperature was measured using TMA (manufactured by NETZSCH), and the results are shown in FIG. 1. Incidentally, the Al amount (500 ppm by mass) in the $Al_2O_3$ added corresponds to the content of Al not included in platinum in the platinum powder of Example 10.

Example 11

Figure 5:
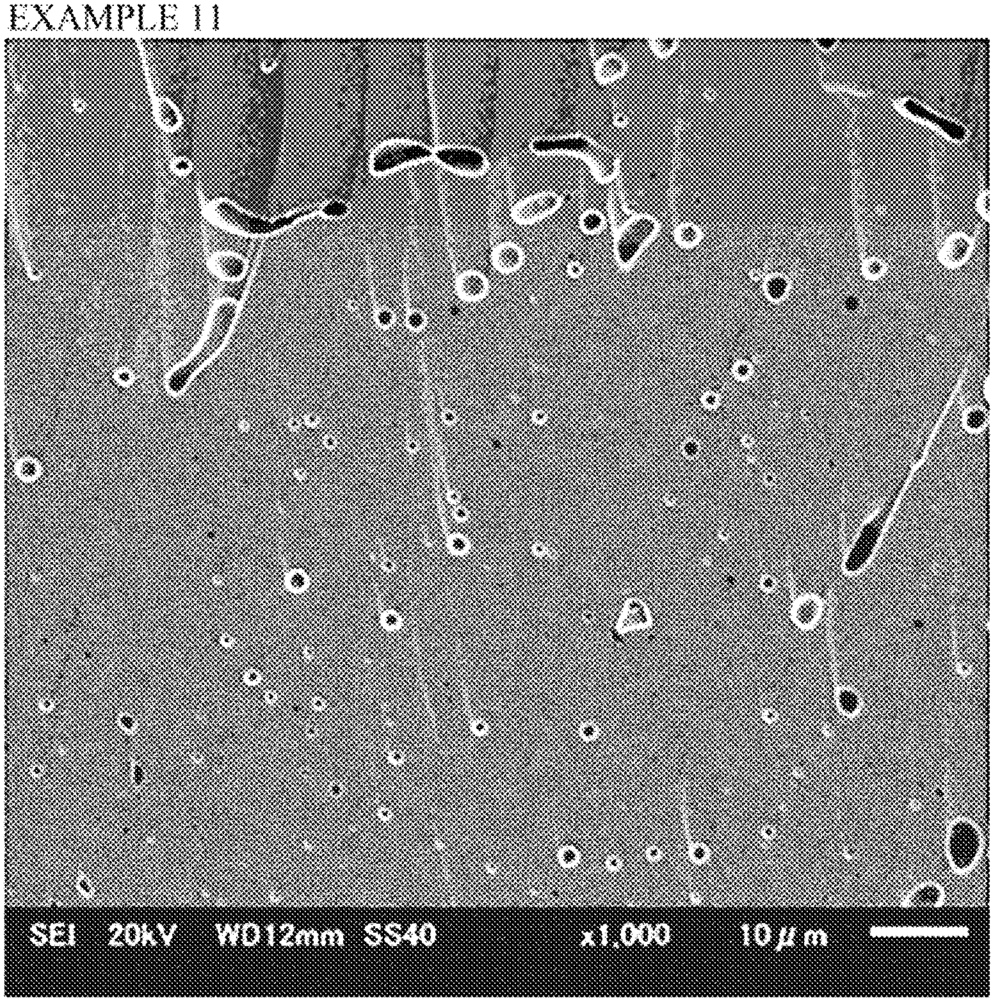
FIG. 5 is a cross-sectional SEM photograph of an electrode film produced using the metal powder of Example 11.
Figure 6:
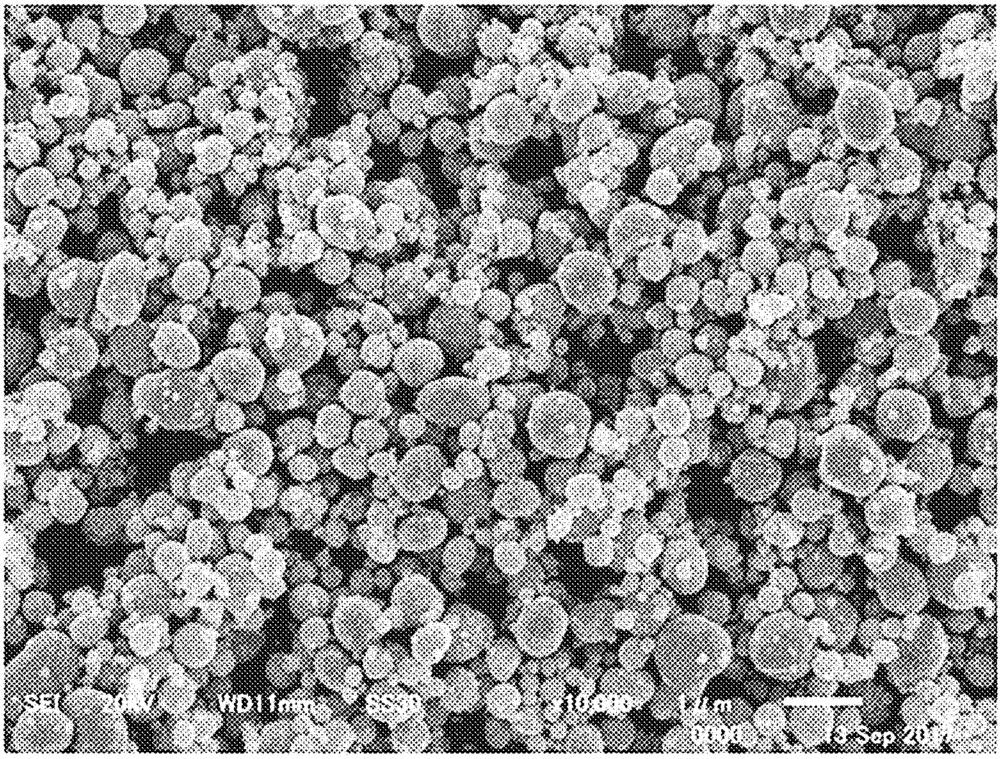
FIG. 6 is an SEM photograph of the metal powder obtained in Example 2.

A platinum powder and a membrane electrode were produced in the same manner as in Example 2 except that the ratio of Pt and Ca elements (Pt:Ca) of platinum compound and calcium compound at the time of production of the platinum powder was changed to 0.3:1 and zirconium oxide ($ZrO_2$) corresponding to a Zr amount of 150 ppm by mass was added to the produced platinum powder. The measurement results of the metal amount contained in the obtained platinum powder and the resistance value in terms of film thickness are shown in Table 1 and FIG. 3. An SEM photograph of the produced membrane electrode is shown in FIG. 5. Incidentally, the Zr amount (150 ppm by mass) in the $ZrO_2$ added corresponds to the content of Zr not included in platinum in the platinum powder of Example 11.

Example 12

A platinum powder and a membrane electrode were produced in the same manner as in Example 2 except that the ratio of Pt and Ca elements (Pt:Ca) of platinum compound and calcium compound at the time of production of the powder was changed to 0.7:1 and calcium carbonate ($CaCO_3$) corresponding to a Ca amount of 100 ppm by mass was added to the produced platinum powder. The measurement results of the metal amount contained in the obtained platinum powder and the resistance value in terms of film thickness are shown in Table 1 and FIG. 3. Incidentally, the Ca amount (100 ppm by mass) in the $CaCO_3$ added corresponds to the content of Ca not included in platinum in the platinum powder of Example 12.

Example 13

A platinum powder and a membrane electrode were produced in the same manner as in Example 2 except that the ratio of Pt and Ca elements (Pt:Ca) of platinum compound and calcium compound at the time of production of the powder was changed to 0.6:1 and calcium carbonate ($CaCO_3$) corresponding to a Ca amount of 100 ppm by mass was added to the produced platinum powder. The measurement results of the metal amount contained in the obtained platinum powder and the resistance value in terms of film thickness are shown in Table 1 and FIG. 3. Incidentally, the Ca amount (100 ppm by mass) in the $CaCO_3$ added corresponds to the content of Ca not included in platinum in the platinum powder of Example 13.

Example 14

A platinum powder and a membrane electrode were produced in the same manner as in Example 2 except that the ratio of Pt and Ca elements (Pt:Ca) of platinum compound and calcium compound at the time of production of the powder was changed to 0.5:1 and calcium carbonate ($CaCO_3$) corresponding to a Ca amount of 100 ppm by mass was added to the produced platinum powder. The measurement results of the metal amount contained in the obtained platinum powder and the resistance value in terms of film thickness are shown in Table 1 and FIG. 3. Incidentally, the Ca amount (100 ppm by mass) the $CaCO_3$ added corresponds to the content of Ca not included in platinum in the platinum powder of Example 14.

Example 15

A platinum powder and a membrane electrode were produced in the same manner as in Example 2 except that the ratio of Pt and Ca elements (Pt:Ca) of platinum compound and calcium compound at the time of production of the powder was changed to 0.3:1 and calcium carbonate ($CaCO_3$) corresponding to a Ca amount of 100 ppm by mass was added to the produced platinum powder. The measurement results of the metal amount contained in the obtained platinum powder and the resistance value in terms of film thickness are shown in Table 1 and FIG. 3. Incidentally, the Ca amount (100 ppm by mass) in the $CaCO_3$ added corresponds to the content of Ca not included in platinum in the platinum powder of Example 15.

Example 16

A platinum powder and a membrane electrode were produced in the same manner as in Example 2 except that the ratio of Pt and Ca elements (Pt:Ca) of platinum compound and calcium compound at the time of production of the powder was changed to 0.2:1 and calcium carbonate ($CaCO_3$) corresponding to a Ca amount of 100 ppm by mass was added to the produced platinum powder. The measurement results of the metal amount contained in the obtained platinum powder and the resistance value in terms of film thickness are shown in Table 1 and FIG. 3. Incidentally, the Ca amount (100 ppm by mass) in the $CaCO_3$ added corresponds to the content of Ca not included in platinum in the platinum powder of Example 16.

Comparative Example 1

A platinum powder and a membrane electrode were produced in the same manner as in Example 2 except that calcium carbonate ($CaCO_3$) corresponding to a Ca amount of 1,000 ppm by mass was added to the produced platinum powder. The measurement results of the metal amount contained in the obtained platinum powder and the resistance value in terms of film thickness are shown in Table 1 and FIG. 3. Incidentally, the Ca amount (1,000 ppm by mass) in the $CaCO_3$ added corresponds to the content of Ca not included in platinum in the platinum powder of Comparative Example 1.

Comparative Example 2

A platinum powder and a membrane electrode were produced in the same manner as in Example 2 except that calcium carbonate ($CaCO_3$) corresponding to a Ca amount of 2,000 ppm by mass was added to the produced platinum powder. The measurement results of the metal amount contained in the obtained platinum powder and the resistance value in terms of Film thickness are shown in Table 1 and FIG. 3. Incidentally, the Ca amount (2,000 ppm by mass) in the $CaCO_3$ added corresponds to the content of Ca not included in platinum in the platinum powder of Comparative Example 2.

Comparative Example 3

A platinum powder and a membrane electrode were produced in the same manner as in Example 2 except that aluminum oxide ($Al_2O_3$) corresponding to an Al amount of 1,000 ppm by mass was added to the produced platinum powder. The measurement results of the metal amount contained in the obtained platinum powder and the resistance value in terms of film thickness are shown in Table 1 and FIG. 3. Incidentally, the Al amount (1,000 ppm by mass) in the $Al_2O_3$ added corresponds to the content of Al not included in platinum in the platinum powder of Comparative Example 3.

TABLE 1

| | Amount of Metal (Ca, Al, Zr) Element (ppm by mass) | Included Ca Amount (ppm by mass) | Include Al Amount (ppm by mass) | Included Zr Amount (ppm by mass) | Amount of Ca Added (ppm by mass) | Amount of Al Added (ppm by mass) | Amount of Zr Added (ppm by mass) | Resistance Value in Terms of Film Thickness (mΩ/sq/10 μm) | Pt:Ca Element Ratio | Heat Treatment Temperature, Time |
|---|---|---|---|---|---|---|---|---|---|---|
| Example 1 | 19-39 | 19 | <10 | <10 | — | — | — | 14.1 | 2.2:1 | 1300° C., 1 h |
| Example 2 | 30-50 | 30 | <10 | <10 | — | — | — | 14.0 | 2.2:1 | 1000° C., 1 h |
| Example 3 | 29-49 | 19 | <10 | <10 | 10 | — | — | 13.2 | 2.2:1 | 1300° C., 1 h |
| Example 4 | 40-60 | 30 | <10 | <10 | 10 | — | — | 13.1 | 2.2:1 | 1000° C., 1 h |
| Example 5 | 80-100 | 30 | <10 | <10 | 50 | — | — | 13.2 | 2.2:1 | 1000° C., 1 h |
| Example 6 | 130-150 | 30 | <10 | <10 | 100 | — | — | 13.2 | 2.2:1 | 1000° C., 1 h |
| Example 7 | 530-550 | 30 | <10 | <10 | 500 | — | — | 13.2 | 2.2:1 | 1000° C., 1 h |
| Example 8 | 800-820 | 30 | <10 | <10 | 770 | — | — | 14.1 | 2.2:1 | 1000° C., 1 h |
| Example 9 | 130-150 | 30 | <10 | <10 | — | 100 | — | 13.1 | 2.2:1 | 1000° C., 1 h |
| Example 10 | 530-550 | 30 | <10 | <10 | — | 500 | — | 13.5 | 2.2:1 | 1000° C., 1 h |
| Example 11 | 300-320 | 150 | <10 | <10 | 0 | — | 150 | 13.0 | 0.3:1 | 1000° C., 1 h |
| Example 12 | 145-165 | 45 | <10 | <10 | 100 | — | — | 13.2 | 0.7:1 | 1000° C., 1 h |
| Example 13 | 153-173 | 53 | <10 | <10 | 100 | — | — | 13.4 | 0.6:1 | 1000° C., 1 h |
| Example 14 | 200-220 | 100 | <10 | <10 | 100 | — | — | 14.3 | 0.5:1 | 1000° C., 1 h |
| Example 15 | 250-270 | 150 | <10 | <10 | 100 | — | — | 14.2 | 0.3:1 | 1000° C., 1 h |
| Example 16 | 300-320 | 200 | <10 | <10 | 100 | — | — | 14.7 | 0.2:1 | 1000° C., 1 h |
| Comparative Example 1 | 1030-1050 | 30 | <10 | <10 | 1000 | — | — | 15.5 | 2.2:1 | 1000° C., 1 h |

TABLE 1-continued

| | Amount of Metal (Ca, Al, Zr) Element (ppm by mass) | Included Ca Amount (ppm by mass) | Include Al Amount (ppm by mass) | Included Zr Amount (ppm by mass) | Amount of Ca Added (ppm by mass) | Amount of Al Added (ppm by mass) | Amount of Zr Added (ppm by mass) | Resistance Value in Terms of Film Thickness (mΩ/sq/10 μm) | Pt:Ca Element Ratio | Heat Treatment Temperature, Time |
|---|---|---|---|---|---|---|---|---|---|---|
| Comparative Example 2 | 2030-2050 | 30 | <10 | <10 | 2000 | — | — | 15.1 | 2.2:1 | 1000° C., 1 h |
| Comparative Example 3 | 1030-1050 | 30 | <10 | <10 | — | 1000 | — | 15.3 | 2.2:1 | 1000° C., 1 h |

The results above demonstrate that when a membrane electrode is produced using the metal powders of Examples 1 to 16 in which the total of the contents of Ca, Al and Zr is from 10 to 900 ppm by mass, the resistance value can be kept low.

While the invention has been described in detail and with reference to specific embodiments thereof, it will be apparent to one skilled in the art that various changes and modifications can be made therein without departing from the spirit and scope of the invention. This application is based on a. Japanese patent application filed on Mar. 30, 2018 (Application No. 2018-068687), the entirety of which is incorporated herein by reference.

The invention claimed is:

1. A metal powder, which is a platinum- or platinum alloy-containing metal powder for an electrically conductive paste, wherein the powder contains, as the metal element, metal elements other than Pt, the metal elements other than Pt contain at least Ca and may further contain Al and Zr, out of metal elements other than Pt, the total of the contents of Ca, Al and Zr is from 10 to 900 ppm by mass, and the platinum alloy is at least one platinum alloy selected from a platinum-gold alloy, a platinum-rhodium alloy, and a platinum-palladium alloy.

2. The metal powder according to claim 1, wherein the content of Ca as a metal element included in the platinum or platinum alloy is 200 ppm by mass or less.

3. The metal powder according to claim 1, wherein the content of Ca as a metal element included in the platinum or platinum alloy is 10 ppm by mass or more.

4. The metal powder according to claim 1, wherein out of metal elements other than Pt, the contents of Ca, Al and Zr which are not included in the platinum or platinum alloy are from 10 to 900 ppm by mass.

5. The metal powder according to claim 1, wherein the average particle diameter D50 is from 0.1 to 5.0 μm.

6. A metal powder, which is a platinum- or platinum alloy-containing metal powder for an electrically conductive paste, wherein the powder contains, as the metal element, metal elements other than Pt, the metal elements other than Pt contain at least Ca and may further contain Al and Zr, out of metal elements other than Pt, the total of the contents of Ca, Al and Zr is from 30 to 900 ppm by mass and at the same time, the content of Ca as a metal element included in the platinum or platinum alloy is 30 ppm by mass or more, and the content of the platinum or platinum alloy in the metal powder is 98.0 mass % or more relative to the total of the metal powder excluding the content of Ca.

7. The metal powder according to claim 6, wherein the content of Ca as a metal element included in the platinum or platinum alloy is from 30 to 60 ppm by mass and at the same time, the total of the contents of Ca, Al and Zr which are not included in the platinum or platinum alloy is from 10 to 500 ppm by mass, or wherein the content of Ca as a metal element included in the platinum or platinum alloy is from 30 to 150 ppm by mass and at the same time, the powder contains Al and/or Zr which are not included in the platinum or platinum alloy.

8. The metal powder according to claim 6, wherein the content of Ca as a metal element included in the platinum or platinum alloy is 200 ppm by mass or less.

9. The metal powder according to claim 6, wherein the platinum alloy is at least one platinum alloy selected from a platinum-gold alloy, a platinum-rhodium alloy, and a platinum-palladium alloy.

10. The metal powder according to claim 6, wherein out of metal elements other than Pt, the total of the contents of Ca, Al and Zr which are not included in the platinum or platinum alloy is from 10 to 800 ppm by mass.

11. The metal powder according to claim 6, which contains, as the metal element, at least either one of Al and Zr.

12. The metal powder according to claim 6, wherein the average particle diameter D50 is from 0.1 to 5.0 μm.

13. A metal powder, which is a platinum- or platinum alloy-containing metal powder for an electrically conductive paste, wherein the powder contains, as the metal element, metal elements other than Pt, the metal elements other than Pt contain Ca and at least one of Al or Zr, out of metal elements other than Pt, the total of the contents of Ca, Al and Zr is from 10 to 900 ppm by mass.

14. The metal powder according to claim 13, wherein the content of Ca as a metal element included in the platinum or platinum alloy is 200 ppm by mass or less.

15. The metal powder according to claim 13, wherein the content of Ca as a metal element included in the platinum or platinum alloy is 10 ppm by mass or more.

16. The metal powder according to claim 13, wherein out of metal elements other than Pt, the contents of Ca, Al and Zr which are not included in the platinum or platinum alloy are from 10 to 900 ppm by mass.

17. The metal powder according to claim 13, wherein the average particle diameter D50 is from 1.0 to 5.0 μm.

* * * * *